Feb. 4, 1964 C. VAN DER LELY 3,120,092
IMPLEMENT FOR LATERALLY DISPLACING CROP LYING ON THE GROUND
Filed May 6, 1959 5 Sheets-Sheet 3

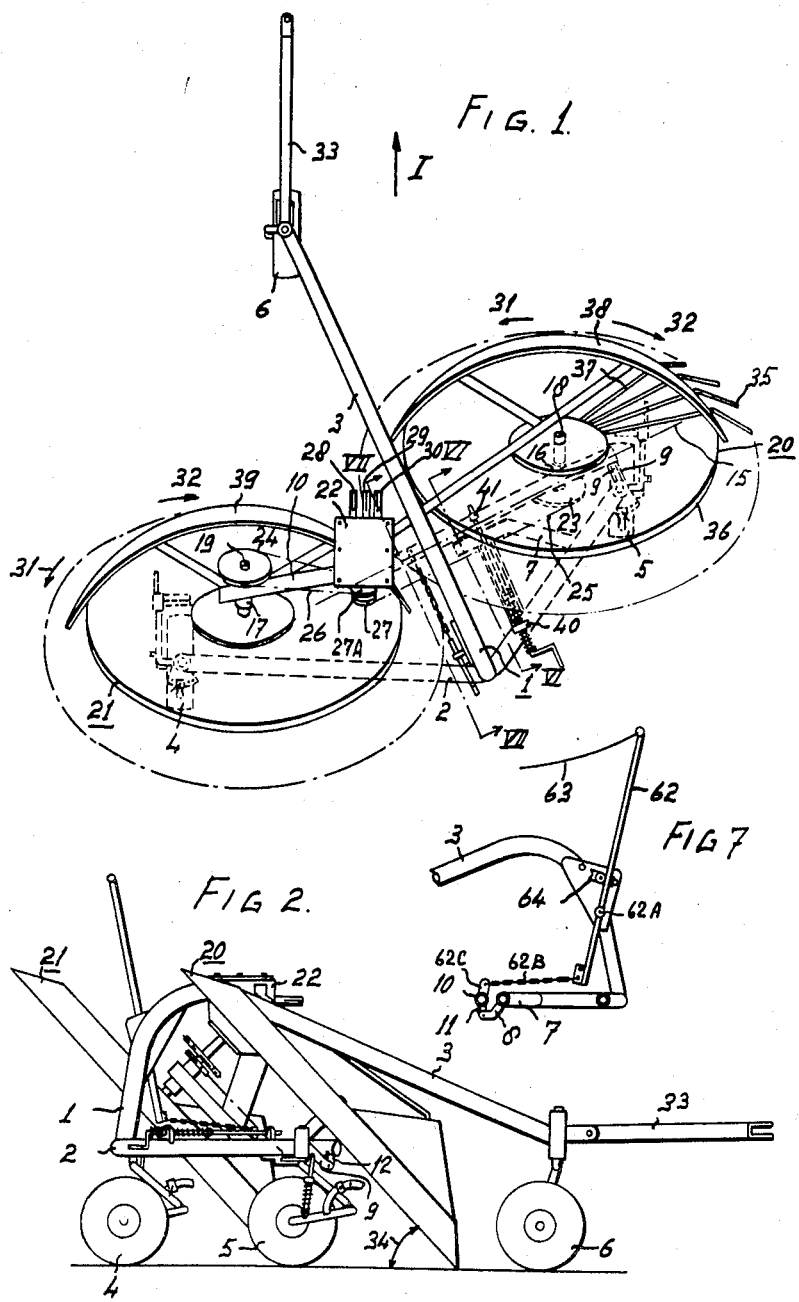

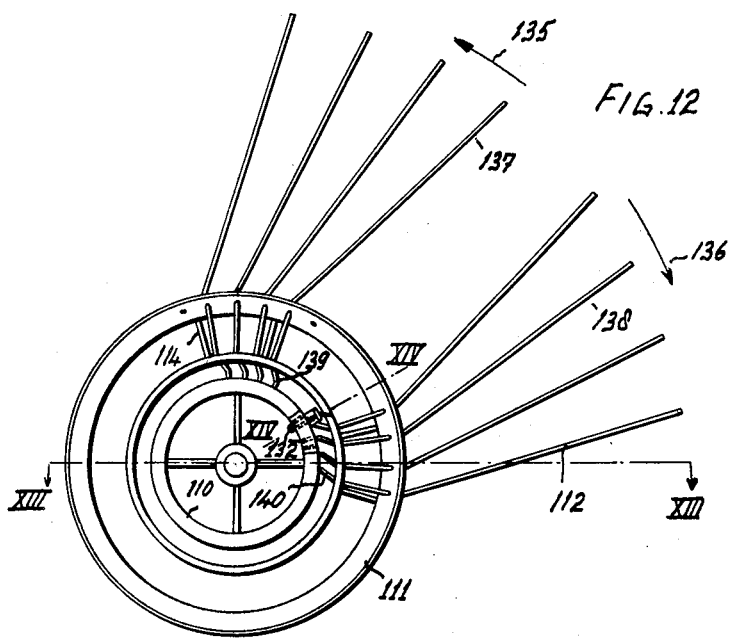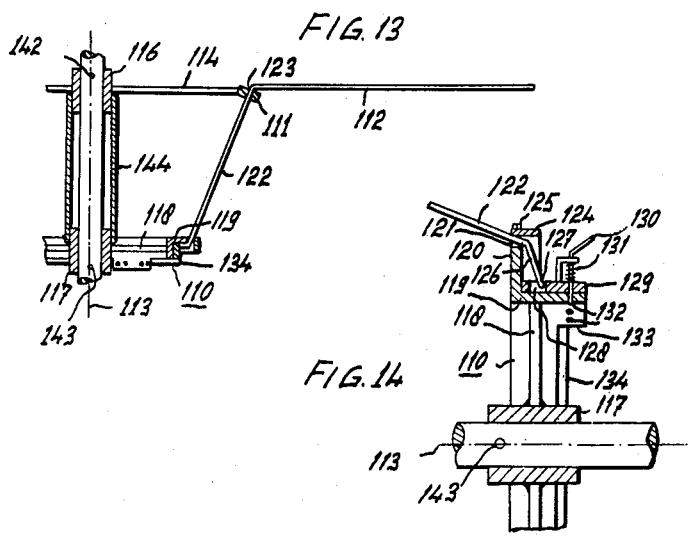

United States Patent Office 3,120,092
Patented Feb. 4, 1964

3,120,092
IMPLEMENT FOR LATERALLY DISPLACING CROP LYING ON THE GROUND
Cornelis van der Lely, Maasland, South-Holland, Netherlands, assignor to Patent Concern N.V., Willemstad, Netherlands, a limited liability company
Filed May 6, 1959, Ser. No. 811,445
Claims priority, application Netherlands May 27, 1958
21 Claims. (Cl. 56—400)

This invention relates to an implement for laterally displacing crop lying on the ground.

Known implements for this purpose include at least one rotatable tined raking member. The latter is arranged so that in the employment of the implement, at a lower region of the raking member the tines thereof encounter the crop lying on the ground and displace it laterally.

Due to the rotation of the raking member, after the tines have laterally displaced some crop they rise from the ground and desirably shed any crop which they have picked up. If the tines did not shed the crop, then it will be appreciated that the rotation of the raking member would cause the unshed crop to be carried up to a position from whence it may be dropped back onto ground that has already been worked. It is therefore important that on the rising side of the raking member the tines should be backwardly directed with reference to the direction of rotation of the raking member.

Once the tines have been brought to a correct setting where they are directed backwardly with reference to the direction of rotation of the raking member, if it is desired to reverse the direction of rotation of the raking member then usually it is necessary to remove the latter from the implement and to turn it round and refix it in position. It is an object of the invention to obviate this necessity.

According to a first aspect of the invention there is provided for an implement for laterally displacing crop lying on the ground, a tined raking member adapted to be rotated so as to bring the tines at a lower region of said member into contact with the ground and/or the crop lying thereon, the tines of said raking member each being adjustable from one setting to another by movement thereof about a pivotal axis, said one setting being such that the tines are directed backwardly with reference to one intended direction of rotation of the raking member, while the other setting is such that the tines are directed backwardly with reference to an opposite intended direction of rotation of the raking member.

According to a second aspect of the invention there is provided an implement for laterally displacing crop lying on the ground, comprising a frame and at least one tined, rotatable, rake wheel carried by said frame, said rake wheel being arranged for rotation in a plane which lies substantially transverse to the intended direction of travel of the implement, and which is inclined to the horizontal at an angle of between about 30 to 60 degrees in such a way that the tines of the rake wheel can engage the ground and/or the crop lying thereon at a lower region of the wheel, from which region the wheel extends upwardly and rearwardly with reference to said intended direction of travel.

For a better understanding of the invention and to show how the same may be carried into effect, reference will now be made, by way of example, to the accompanying drawings in which:

FIGURE 1 is a plan view of an implement embodying the invention,

FIGURE 2 is a side view corresponding to FIGURE 1,

Figure 3:
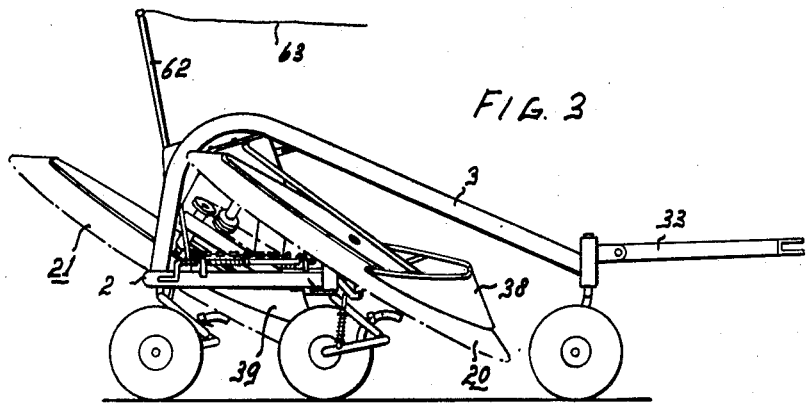
Figure 4:
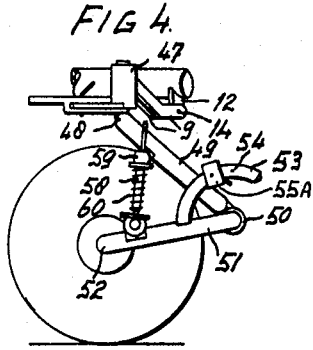
Figure 5:
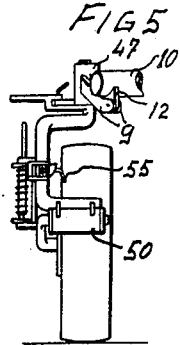
Figure 6:
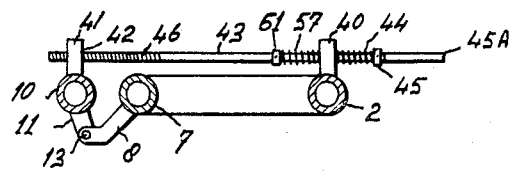
Figure 8:
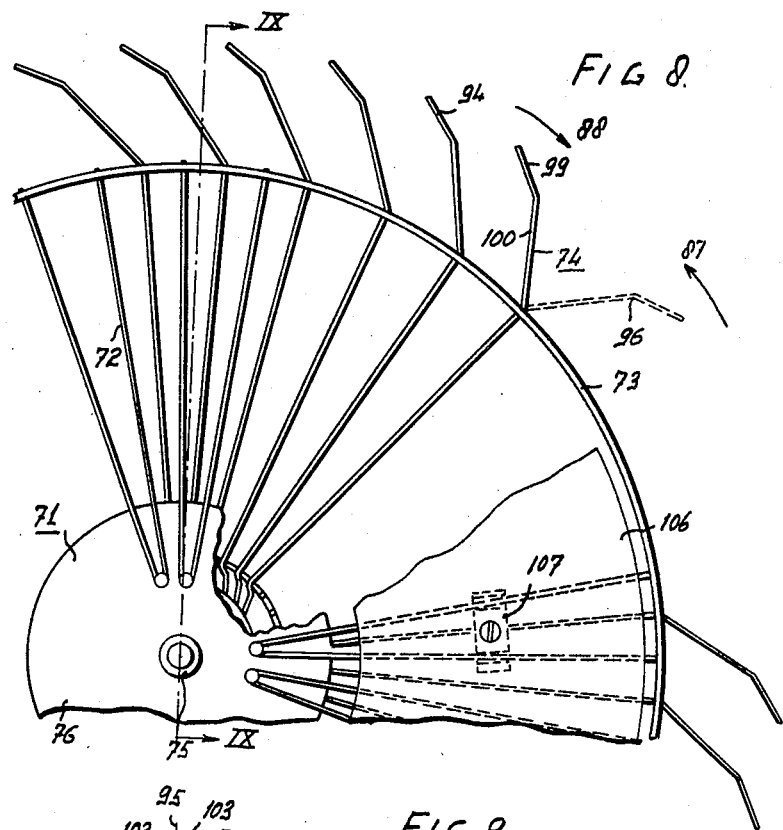
Figure 9:
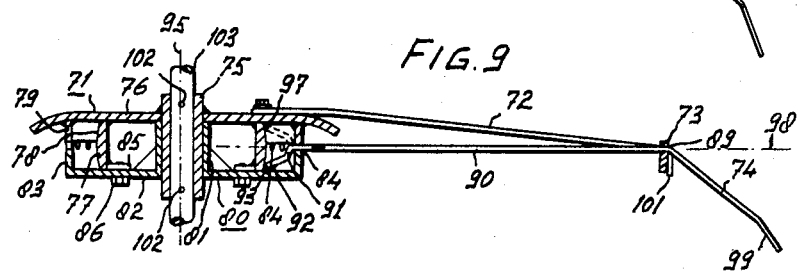
Figure 10:
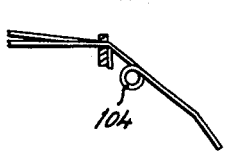
Figure 11:
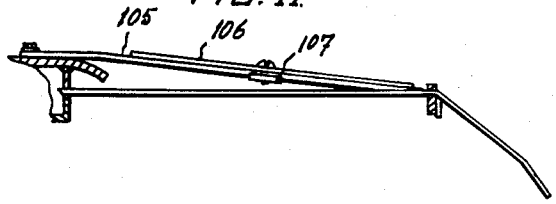
Figure 15:
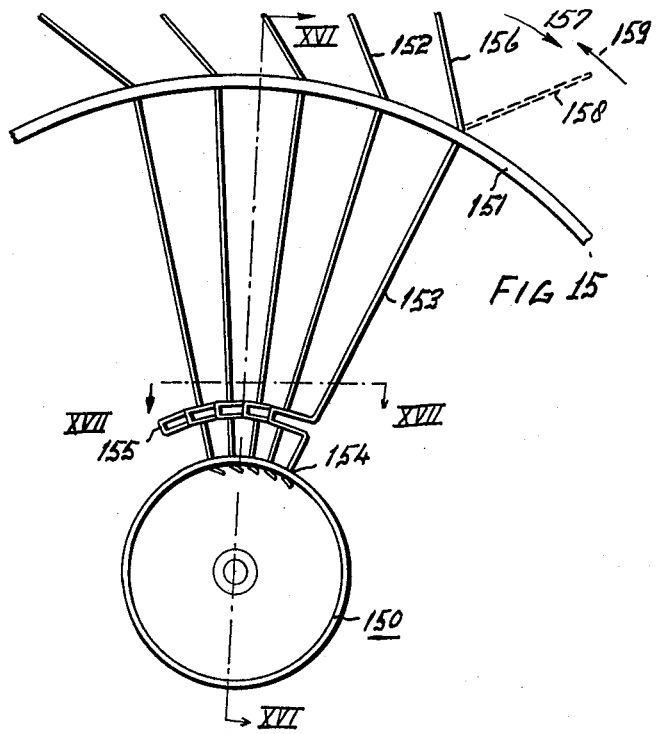
Figure 16:
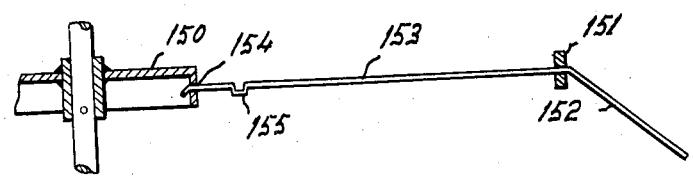
Figure 17:
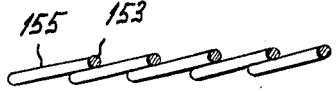

FIGURE 3 is a view similar to FIGURE 2 but showing the implement in its transport position, FIGURE 4 is a side view on an enlarged scale of a ground wheel of the implement shown in FIGURES 1 to 3, FIGURE 5 is a front view corresponding to FIGURE 4, FIGURE 6 is an enlarged sectional view taken on the line VI—VI of FIGURE 1, FIGURE 7 is a side view of a detail of the implement shown in FIGURES 1 to 6, FIGURE 8 is a front view of part of a rake wheel, FIGURE 9 is a sectional view taken on the line IX—IX of FIGURE 8, FIGURE 10 is a side view of a detail of the rake wheel shown in FIGURE 8 in a modified form, FIGURE 11 is a sectional view of a modified detail of the rake wheel shown in FIGURES 8 and 9, FIGURE 12 is a view similar to FIGURE 8, but showing another embodiment of the rake wheel, FIGURE 13 is a sectional view taken on the line XIII—XIII of FIGURE 12, FIGURE 14 shows a detail of the rake wheel shown in FIGURE 13 on an enlarged scale, FIGURE 15 is a view similar to FIGURE 8, but showing yet another embodiment of the rake wheel, FIGURE 16 is a sectional view taken on the line XVI—XVI of FIGURE 15, and FIGURE 17 is a sectional view taken along the line XVII—XVII of FIGURE 15.

The implement shown in FIGS. 1 to 7 comprises a frame 1 including two frame beams 2 and 3 and supported on three ground wheels 4, 5 and 6. The ground wheels 4 and 5 are supported at the ends of the frame beam 2 and the ground wheel 6 is supported at the front end of the frame beam 3. The frame beam 2 carries a supporting beam 7 (FIGS. 1 and 6), which has a bifurcated bracket 8 (FIG. 6) at its free end. The end of the frame beam 2 near the ground wheel 5 also has a bifurcated bracket 9. To the brackets 8 and 9 there is secured a frame beam 10 by means of lugs 11 and 12 inserted in the brackets 8 and 9 and fastened therein with aligned pins 13 and 14. Since the pins 13 and 14 are aligned, the beam 10 is capable of turning in relation to the frame 1, about a hinge axis indicated at 15. Bearings 16 and 17 are disposed at the ends of the frame beam 10 and shafts 18 and 19 carrying rake wheels 20 and 21 are mounted on said bearings, so that the shafts of the rake wheels occupy fixed relative positions.

The rake wheels 20 and 21 are driven from a gear-box 22 also arranged on the beam 10. The shafts 18 and 19 support sprocket wheels 23 and 24, which are connected by means of chains 25 and 26, with sprocket wheels 27 and 27a mounted on the gear-box 22. The latter has three input shafts 28, 29 and 30, which can be connected, for example, with the power take-off shaft of a tractor used for towing the implement. The gear-box 22 is constructed such that when the shaft 28 is coupled to the power take-off shaft, the rake wheels 20 and 21 will be rotated in the direction of the arrows 31, whereas, when either of the shafts 29 or 30 is coupled to the power take-off shaft, the rake wheels 20 and 21 will rotate in the direction of the arrows 32. When the shaft 30 is employed, with the same speed of input drive, the rake wheels will rotate more rapidly than when the shafts 28 and 29 are employed. When the overlapping rake wheels 20 and 21 rotate in the direction of the arrows 31, and the implement is towed by draw-bar 33 provided at the front end of the frame beam 3 in the direction of the arrow I, the implement will operate as a side-delivery rake, the rake wheel 20 displacing crop towards the rake wheel 21, and the latter, in turn, displacing the crop to the left to form one windrow.

In order to ensure an adequate working width during movement in the direction I, the rake wheels 20 and 21, which have a diameter of about 1.60 metres, are arranged so that they rotate in planes inclined to the ground at an angle of between about 30° to 60°. Such angle is indicated at 34 in FIG. 2, and it will be noted that the rake wheels each are in contact with the ground. The rake wheels extend upwardly and rearwardly with reference to the direction of travel of the implement from the point of contact with the ground. The inclination of the rake wheels ensures that many more tines 35 thereof will contact the ground than if the rake wheels were vertical, so that the working width of one rake wheel is considerably larger than that of a similar, but vertically disposed, rake wheel. Moreover, the inclined position has the advantage that the tines move upwardly and backwardly at the location in a rake wheel where the crop has to be shed from the tines. Correct shedding of the crop can be further ensured by directing the tines 35 so that the tips thereof point backwardly with reference to the direction of rotation of the rake wheel. As is indicated for the tines 35 in FIG. 1, the rake wheel is suitable for rotation in the direction of rotation 31. The tines 35 are, however, constructed so that they are adjustable to a position whereat the tines 35 point backwardly with reference to the direction of rotation 32. This construction will be hereinafter explained in detail.

It is advantageous to construct the inclined rake wheels so that the peripheral parts thereof can yield resiliently in directions parallel to the axes of rotation of the wheels in order to accommodate unevennesses in the ground.

When the implement travels in the direction I and the rake wheels 20 and 21 rotate in the directions shown by the arrows 32, each rake wheel, independently of the other, will displace crop to the right in FIG. 1, so that the implement acts as a swath turner or tedder, the crop being turned or spread over the field to promote drying. In order to spread the crop so that it is deposited over a great area in a loose condition, the rake wheels 20 and 21 are driven, via the gear-box 22, from the shaft 30 which is coupled to the power take-off shaft of the tractor, thereby causing the rake wheels to rotate more rapidly than if driven from the shaft 29. Owing to the rapid rotation of the rake wheels, the crop will be worked more vigorously by the tines 35 and will be satisfactorily disentangled to promote drying thereof. This higher speed of revolution of the rake wheels can be utilized with particular success, if the crop to be worked is very damp and tends to stick to the ground because of rainy weather.

Each rake wheel includes a rim 36 and spokes 37, and in order to prevent the crop, when the implement is in use, from rising up onto the upper sides of the inclined rake wheels, screening baffles 38 and 39 are supported on the upper surface of the rake wheels as best seen in FIG. 2. If the crop were allowed to rise onto the wheel surfaces, it would be carried along thereby and finally dropped back onto the ground which had previously been cleared, which would be most undesirable particularly in the case of side-delivery raking.

In order to adjust the backward inclination of the rake wheels 20 and 21 according to various kinds of work to be done and to the crop to be worked, the frame beam 2 is provided with a bearing 40 and the frame beam 10 with a lug 41 having an internally screw-threaded hole 42. In the bearing 40 is journalled a spindle 43, on which a spring 44 and a collar 45 are mounted on one side of the bearing 40, and a spring 57 and a collar 61 on the other side thereof. The spring 44 tends to lift the rake wheels and hence prevents them from bearing on the ground with excessive pressure. The springs 44 and 57 together allow the rake wheels to float and hence to accommodate unevennesses in the ground. At one end the spindle 43 is provided with a crank 45A, while the other end is provided with screw-threading 46, and is supported in the tapped hole 42. By turning the spindle 43 with the aid of the crank 45A, the threading 46 on spindle 43 will cause the lug 41 to be displaced, so that the beam 10 will turn about the hinge axis 15. When the beam 10 turns about the hinge axis 15, the rake wheels 20 and 21 which are carried on the frame beam 10, will swing about the axis 15 and occupy a more or less inclined position and change the pressure of the tines on the ground. Since the gear-box 22 is also mounted on the beam 10, the drive to the rake wheels, when they are adjusted about the hinge axis 15, will not be affected by the adjustment. Apart from adjusting the rake wheels, they may be turned about the hinge axis 15 to such an extent that they are freed from the ground, so that a transport position is reached as is shown in FIG. 3, the rake wheels then occupying a more nearly horizontal position. This transport position can also be attained by pulling forwardly one end of a lever 62 by means of a cable 63 (see FIG. 7). The lever 62 is pivotally supported at 62A upon a plate fixed to the frame beam 3, the bottom end of the lever being connected by a chain 62B with an arm 62C fixed on the beam 10. A locking device 64 is provided for holding the lever 62 in its forward position. The locking device is similar to that as described in applicant's U.S. Patent No. 3,003,302, wherein in FIGS. 7 and 8 a lock 65 is shown which is operative in the same manner as locking device 64 in the present application. This locking device according to the application can be released by a further pull upon the cable 63.

As shown in FIGS. 1, 4 and 5 a bearing 47 is provided one at each end of the frame beam 2, a vertical shaft 48 being journalled therein so as to be turnably adjustable and fixable. The shaft 48 has a downwardly sloping portion 49 carrying at its lower end a bearing 50 in which the horizontal, end portion of a bar 51 is journalled. The other end portion 52 of the bar also forms a horizontal axle for the wheel 5. In order to fix the bar 51 with the ground wheel 5 in different positions relative to the frame, the bar 51 is swung about the axis of the bearing 50, the bar 51 carrying an arcuate strip 53 formed with holes 54. The portion 49 of the shaft 48 has a staple 55A fixed thereon, the strip 53 being arranged to slide in the staple and to be fixed in a desired position by entering a locking pin 55 in any one of the holes 54. Adjustment of the bar 51 about the axis of the bearing 50 can be readily effected because it is supported by a spring strut consisting of a rod 58 pivotally connected at one end to the bar and passing at the other end through a swivel 59 mounted on the portion 49 of the shaft 48. A compression spring 60 surrounds the rod 58 and is supported between the swivel 59 and the lower end of the rod 58. Thus, when the locking pin 55 is released, the implement can be resiliently supported during operation. The possibility of vertical adjustment of the rake wheels can be utilized to advantage in the different ways of working hay, for example, in swath turning, tedding and spreading of windrows. Only the mounting for the ground wheel 5 has been described, but it will be understood that a similar mounting is provided for the ground wheel 4.

The arrangement of the tines 35 is such that, near the ground, viewed transversely to the direction of travel, they are substantially vertical. The hinge axis 15 extends parallel to the line joining the centers of the rake wheels 20 and 21 and is located as near as possible to such line.

The rake wheels 20 and 21 have been shown in the figures thus far described, only in skeleton form. In FIGURES 8 to 17 there are described several forms of rake wheels any of which may be used to constitute the rake wheels 20 and 21. Referring first to the construction shown in FIGURES 8 and 9, it will be seen that the rake wheel comprises a hub 71 which supports a rim 73 by means of spokes 72, the rim having peripherally extending tines 74. As appears best from FIGURE 9, the hub consists of a sleeve 75 mounted upon a shaft and having a disc 76 welded thereto. One face of the disc has a short tubular member 77 fixed thereto, the member 77 being concentric with the sleeve 75. The outer surface 78 of the member 77 is convex with respect to the hub 75 as seen in cross-section in FIG. 9. The plate 76 also has secured thereon an annulus 79 which is likewise concentric with the sleeve 75. A closure member 80 is provided, which includes a bearing sleeve 81 which is mounted upon the sleeve 75, a disc portion 82 and an annular flange 83, the disc portion 82 lying substantially perpendicular to the axis of the bearing sleeve 81. The annular flange 83 is concentric with the bearing sleeve 81 and mates with the annulus 79, the combined axial length of the annulus 79 and the annular flange 83 being equal to the axial length of the bearing sleeve 81 and that of the tubular member 77. Slots 84 are formed in the upper marginal part of the flange 83, such slots serving for the passage therethrough of prolongations of the tines 74.

In order to secure the closure member 80 to the disc 76, the tubular member 77 has several lugs 85 each formed with an internally screw-threaded hole. The closure member 80 is held in position with bolts 86 engaged in the lugs.

In a manner which will now be explained, the tines 74 are so disposed in the rake wheel that they can extend rearwardly in relation to either possible direction of rotation of the rake wheel, such directions of rotation being indicated by the arrows 87 and 88 in FIGURE 8. Each tine 74 has a radially, inwardly directed, prolongation 90 which is passed through an appropriate hole 89 in the rim 73. The radially inner end of the prolongation is accommodated in an appropriate slot 84 in the flange 83. Thus each tine 74 is capable of turning about the center line of its prolongation 90, such center line constituting a pivot axis for the tine. Within the flange 83, each prolongation is downwardly cranked as at 91 so as to prevent the prolongation 90 from being withdrawn axially out of the slot 84. It will be understood that in order to obtain a satisfactory raking action with the tines 74, it is necessary that not only should the tines extend rearwardly in relation to the direction of rotation of the wheel, but also that the tines should be held in position so that they cannot undesirably change their setting during the working rotation of the rake wheel. The setting of a tine for rotation of the rake wheel in the direction indicated by the arrow 88, is indicated at 94 in full lines in FIGURE 8. For rotation in the direction 87, the correct setting for the tines is indicated in dotted lines at 96 in FIGURE 8. When the tine is in the setting indicated at 94, the extremity of the terminal portion 92 is located in the corner indicated at 93, this corner being formed between the external curved surface of the tubular member 77 and the interior face of the disc portion 82 of the closure member. When the tine is in the setting indicated at 96, the extremity of the terminal portion 92 of the tine occupies the position shown in dotted lines in FIGURE 9 at 97 and is then seated in the corner formed between the tubular member 77 and the inner face of the disc 76.

The settings 94 and 96 are symmetrical about a plane which includes the rotational axis of the rake wheel and the pivotal axis of the tine. When a tine is moved from one setting to the other, the extremity of the terminal portion 92 has to move over the convex surface of the tubular member 77. Hence the change from one setting to the other requires the exertion of a certain force to overcome the resistive stresses set up in the terminal portions 92, and hence the arrangement can be such that a tine 74 will not change from one setting to the other when the direction of rotation of the rake wheel is reversed. Each tine 74 together with its prolongation 90, cranked portion 91 and terminal portion 92, is so shaped that the tine 74 is inclined to the plane which is perpendicular to the rotational axis of the wheel and which contains the prolongation 90, this plane being indicated by the chain line 98 in FIGURE 9.

The disc 76 and the disc portion 82 constitute stops for the terminal portions 92 whereby the prolongations 90 together with their tines cannot turn further about their pivotal axes than is indicated for the two shown settings. Each tine 74 has a ground-engaging portion 99 which is slightly inclined to the remaining portion 100. Each portion 99 and its associated portion 100 and associated prolongation 90 are located in one and the same plane. The associated cranked portion 91 of a tine is at an angle of about 90° to the plane which contains the other enumerated associated portions.

The spokes 72 of the wheel are passed through holes in the rim 73, and just beyond the rim have bent-over ends 101, such spokes serving as the principal support for the rim. Both the spokes and the prolongations 90 extend radially from the rotational axis 95 of the wheel. By making the spokes 72 from the resilient steel wire, the rim 73 is capable of readily deflecting in a direction parallel with the rotational axis 95, whereby the wheel will accommodate unevennesses in the ground.

In order to obtain a satisfactory raking action with the wheel, it is also desirable to make the tines 74 and their prolongations 90 from resilient steel wire so that the tines can deflect resiliently when encountering unevennesses in the ground.

The rake wheel described with reference to FIGURES 8 and 9 is suitable for use with the implement described with reference to FIGURES 1 to 7, the rake wheel then being driven from a source of power. The sleeve 75 is fixed to the supporting shaft 103 with the aid of pins 102. It will, however, be appreciated that the rake wheel could be used in an implement other than that previously described. The rake wheel could, for example, be used in a raking implement in which the raking members are driven only by their contact with the ground. It will then be advantageous to arrange the wheel so as to be freely rotatable upon the shaft 103.

Greater flexibility of each tine may be achieved by forming a loop 104 therein at a location near to the rim as shown in FIGURE 10. The plane of the rake wheel may be closed with the aid of a plate 106 which may secured to the spokes 72 by clips 107 (see FIGURES 8 and 11). By employing a plate such as 106, the crop is prevented from penetrating between the spokes 72 and the prolongations 90 and from being carried along undesirably by the body of the wheel and discharged at undesired locations.

When the rake wheel described with reference to FIGURES 8 to 11 occupies the position of the rake wheel 20 shown in FIGURE 2, it will be realized that the rotary axis of the wheel is at an angle of about 45° to the ground. The tines in contact with the ground are in this case located in front of the center of the rake wheel. The rake wheel could, however, be employed in a similar arrangement where the tines in contact with the ground are located behind the center of the rake wheel.

Referring now to FIGURES 12, 13 and 14, the rake wheel there shown has a rim 111 for supporting tines 112. The rim 111 is spaced from the hub 110 in an axial direction and is centered upon the rotational axis 113 of the wheel with the aid of spokes 114 secured to a sleeve 116. The hub 110 consists of a sleeve 117 which carries a ring 119 joined therewith by spokes 118. The ring 119 is formed with an annular flange 120 located in a plane perpendicular to the rotational axis 113 of the wheel. The flange 120 has peripheral slots 121 for the reception of prolongations 122 of the tines 112, the center lines of these prolongations constituting pivotal axes for the tines. The prolongations 122 at one end are passed through holes 123 in the rim 111, and are held in the slots 121 by a sleeve 124 secured to the flange 120 by bolts 125. As seen best in FIGURE 14, the end of each prolongation 122 just beyond the location where it enters slot 121 has a bent terminal portion 126, the extremity 127 of which is accommodated in a hole 128 formed in a sleeve 129 which is turnable upon the ring 119. The sleeve 129 can be locked against rotation upon the ring 119 with the aid of a locking pin 131 which is urged into one of the holes 132 by a spring 131. The holes 132 are formed in a lateral extension of the ring 119.

The sleeve 129 is held against axial displacement from the ring 119 with the aid of a retaining ring 134 secured to the ring 119 so that the sleeve 129 is held between the flange 120 and the ring 134.

The tines 112 can, as before, occupy either of two settings so that whichever way the rake wheel turns, the tines can be directed backwardly with reference to the direction of rotation. Thus when the wheel rotates in the direction indicated by the arrow 135, the tines may have the setting 137, whereas when the wheel rotates in the direction 136, the tines may have the setting 138. The change of setting is effected by turning the tines about their pivotal axes constituted by the prolongations 122 which turn in the holes 123 and the slots 121. A tine in the setting 137 and in its setting 138 occupies positions which are symmetrical with respect to a plane passing through the axis of the prolongation 122 and the rotational axis 113 of the wheel. The turning of a tine from one setting to the other is achieved with the aid of the sleeve 129. The locking pin 130 is withdrawn from the particular hole 132 in which it may be situated, and the sleeve 129 is then turned relatively to the ring 119 until a new position is reached where the locking pin 130 may be allowed to enter another of the holes 132. The relative movement of the sleeve 129 causes the extremity 127 of the terminal portion 126 to be correspondingly displaced whereby the prolongation 122 turns about its axis and causes the setting of the tine 112 to be changed. As appears from FIGURE 13, there are two groups each of two holes 132. Each group corresponds to the one setting or the other for the tines and the choice afforded by having two holes in a group permits adjustment of the position of a tine in either setting. In FIGURE 12, some of the tines are shown in one setting and some in the other. It will be appreciated that this is simply for the purpose of illustration, and that all the tines will normally be in one setting or the other. In the setting 137, the terminal portions occupy the position indicated at 139 in FIGURE 12.

In the setting 138 these same terminal portions will be seen to occupy the position indicated at 140. Each hole 128 which receives the extremity 127 of a terminal portion 126 is so shaped that in the direction of the curved periphery of the sleeve 129 the hole is about the same width as the extremity 127 seated therein. Hence when the sleeve 129 is locked in position the extremity 127 cannot move in such a way as to produce angular movement of the associated prolongation 122. It will of course be understood that the tine associated with the prolongation 122 is capable of deflecting resiliently by torsionally deflecting the prolongation 122, the tine tending always to return either to its setting 137 or 138.

The hole 128 is somewhat elongated in a direction parallel to the axis 113 so that the extremity 127 is capable of moving parallel to such axis when the associated tine is being brought from the one setting to the other. The depth of each hole 128 and the position of the extremity 127 therein, is such that when the terminal portion occupies either the position 139 or the position 140, the extremity is well clear of the outer curved surface of the ring 119 which lies immediately beneath the hole 128. This ensures that in changing from one tine setting to the other the associated extremity 127 does not foul the ring surface 119.

The rake wheel shown in FIGURES 12 to 14 can be employed as the raking member in the implement described with reference to FIGURES 1 to 7, in which case the rake wheel is secured to a supporting shaft with the aid of pins 142 and 143. It will, however, be understood that this form of raking member can alternatively be employed in a different kind of implement in which the rake wheels are ground driven. The rake wheels are then free to rotate on their supporting shafts. In the case where the rake wheel is free for rotation on its supporting shaft, it is advantageous to connect the sleeves 116 and 117 with the aid of a tube 144. This prevents relative angular movement as between the rim 111 and the hub 110.

In comparing the rake wheel construction of FIGURES 8 to 11 and that of FIGURES 12 to 14, it will be noted that in the former case the settings of the tines can be individually changed by the turning of each tine about an axis which is substantially perpendicular to the rotational axis of the wheel, whereas, in the latter case the settings of all the tines are together altered with the aid of the sleeve 129, the tines having pivotal axes which, instead of being substantially perpendicular to the rotational axis, are substantially parallel to the rotational axis of the wheel. It will be understood that in the latter case, if so desired the tines may be arranged for individual adjustment from the one setting to the other. In the former case the tines could be coupled so that they may be simultaneously adjusted from the one setting to the other.

Referring now to FIGURES 15 to 17, there is shown a rake wheel which comprises a hub 150 and a rim 151 from the peripheral surface of which tines 152 extend. Each tine has a prolongation 153 which passes through a hole in the rim 151 and which constitutes a pivotal axis for the tine. The radially inner end of each prolongation 153 is accommodated in a hole 154 in the hub 150, the extremity extending to the inner side of the rim 150 being bent over to retain the prolongation in the hole. The prolongations 153 constitute spokes, and between the hub 150 and the rim 151, each prolongation is bent to form an open loop portion 155. The loop portions 155 are such that the one loop portion bears upon the other as seen best in FIGURE 17.

Each tine 152 can occupy either one of two settings indicated at 156 in full lines in FIGURE 15 and at 158 in dotted lines. The setting 156 is appropriate to the direction of rotation of the wheel indicated by the arrow 157, whereas the setting 158 is appropriate to the direction of rotation indicated by the arrow 159. When a tine is moved from the setting 156 to the setting 158, its loop portion 155 turns about the axis of the prolongation 153 whereby all the other loop portions are caused to make a similar movement about their prolongations so that all the tines will be brought to the changed setting at once.

As appears from FIGURE 16, the tines 152 are each somewhat inclined to the plane containing the prolongations 153. If so desired the tines 152 may be arranged so as to lie substantially in the same plane as that which contains the prolongations 153. This is advantageous if it is desired to employ the rake wheel in such a way that either side thereof may be presented to the crop. It will be understood that the previously described rake wheels can if so desired be employed also so that either side of the rake wheel is presented to the crop.

It may be convenient to have rake wheels with tines which will automatically move from the one setting to the other as the result of changing the direction of rotation of the rake wheel while the tines thereof are maintained in contact with the ground and/or the crop lying thereon. This can be readily achieved with the construction shown in FIGURES 8 to 11 and that shown in FIGURES 15 to 17.

Accordingly, when the direction of rotation of the rake wheel is reversed and the now forwardly directed tines encounter the ground and crop thereon, a force is developed on the tines which acts to pivot the tines in FIGS. 8–11 and FIGS. 15–17 about their pivot axes. In FIGS. 8–11 the tines are individually pivoted whereas in FIGS. 15–17 the tines are simultaneously pivoted. The force on the tines can cause them to pivot until they are rearwardly directed with respect to the direction of rotation of the rake wheel whereupon the tines assume an equilibrium position which is not disturbed until the direction of the rake wheel is again reversed.

What I claim is:

1. In an implement for laterally displacing crop lying on the ground the combination of a raking member and tines operatively supported by said raking member, said raking member being adapted for rotation in opposite directions, said tines making an angle with respect to said raking member and means connecting said tines to said raking member to permit varying said angle by adjustment of said tines with the latter remaining supported by said raking member such that said tines can be placed in different positions with respect to said raking member for opposite directions of rotation of the latter.

2. In an implement for laterally displacing crop lying on the ground, the combination of a raking member and tines operatively associated with said raking member, said raking member being adapted for rotation, means supporting the tines on said raking member for pivotal movement between two settings, said tines in each of said settings being directed backwardly for opposite directions of rotation of the raking member.

3. The combination as claimed in claim 2 comprising means operatively associated with said raking member to insure that each tine is always inclined to a plane perpendicular to the rotational axis of the raking member in one of said settings.

4. The combination as claimed in claim 3 wherein each tine in said settings occupies positions which are symmetrical about a plane which includes the rotational axis of the raking member and the pivotal axis of the tine.

5. The combination as claimed in claim 2 wherein the tines are adapted to engage the ground and include tips to engage the ground.

6. The combination as claimed in claim 2 wherein each tine is supported for pivotal movement about an axis which is substantially perpendicular to the rotational axis of the raking member.

7. The combination as claimed in claim 2 wherein each tine is supported for pivotal movement about an axis which is substantially parallel to the rotational axis of the raking member.

8. The combination as claimed in claim 2 wherein each tine includes a prolongation extending inwardly of the raking member and constituting the pivotal axis for the associated tine, said raking member including a rim and a hub-like element operatively associated therewith and partially constituting said means supporting the tines, said prolongations being turnably supported near one end in said rim and near the other end in said hub-like element of the raking member.

9. The combination as claimed in claim 8 wherein said prolongations include near the hub-like element, a bent portion, said means supporting the tines for pivotal movement further including means to engage said bent portion to hold each tine in either of said settings.

10. The combination as claimed in claim 9 wherein said tine tends always to engage said means which engages said bent portion.

11. The combination as claimed in claim 10 wherein the tine and its prolongation are of resilient steel wire, the tine being capable of deflecting beyond its position in either setting by torsional deflection of the prolongation.

12. The combination as claimed in claim 8 comprising spokes and wherein the tines are supported by said rim which is connected with said hub-like element by said spokes, said spokes being independent of the tines.

13. The combination as claimed in claim 8 wherein the rim and the said hub-like element are located in a plane substantially perpendicular to the rotational axis of the raking member.

14. The combination as claimed in claim 8 wherein the rim and the said hub-like element are spaced apart in a direction parallel to the rotational axis of the raking member.

15. The combination as claimed in claim 2 wherein the pivotal axis of each tine and the rotational axis of the raking member are located in one plane.

16. The combination as claimed in claim 2 comprising means coupling the tines, so that when one tine is brought from one setting to the other the remaining tines are similarly changed from the one setting to the other.

17. The combination as claimed in claim 9 comprising means connecting the said bent portions to effect simultaneous adjustment of the tines from the one setting to the other.

18. The combination as claimed in claim 17 comprising a sleeve provided with holes and wherein said bent portions are located in said holes, the sleeve being adjustable about the rotational axis of the raking member.

19. The combination as claimed in claim 16 wherein the tines have prolongations each including an open loop portion, the loop portions being in contact so that when one of the tines is turned to bring it from the one setting to the other, the remaining tines have their settings correspondingly altered.

20. The combination as claimed in claim 19 wherein each tine includes a bent terminal portion which is coplanar with the prolongation and the tine itself.

21. The combination as claimed in claim 2 comprising means on the raking member for adjusting the positions of the tines in each of said settings.

References Cited in the file of this patent

UNITED STATES PATENTS

| 2,680,343 | Enos | June 8, 1954 |
| 2,689,446 | Sorrels | Sept. 21, 1954 |
| 2,710,519 | Winter | June 14, 1955 |
| 2,722,799 | Cooley | Nov. 8, 1955 |
| 2,852,905 | Van der Lely | Sept. 23, 1958 |

FOREIGN PATENTS

| 516,084 | Italy | Feb. 18, 1955 |
| 536,352 | Italy | Dec. 1, 1955 |
| 187,731 | Austria | Nov. 26, 1956 |
| 790,916 | Great Britain | Feb. 19, 1958 |